Patented Jan. 11, 1927.

1,613,757

UNITED STATES PATENT OFFICE.

ALBERT FERDINAND LINDSTROM, OF NUTLEY, NEW JERSEY, ASSIGNOR TO WESTING-HOUSE LAMP COMPANY, A CORPORATION OF PENNSYLVANIA.

COATING COMPOSITION.

No Drawing.    Application filed September 23, 1921.    Serial No. 502,789.

My invention relates to compositions of matter useful in the art of coating, and more particularly relates to the production of opalescent effects by the application of a coating material to such substances as glass and the like.

An object of my invention is to provide a paint or preparation for producing certain effects in substances when applied thereto.

Another object is the provision of a coating composition which, when applied to such objects as electric lamps, lamp fixtures and the like, will permit such devices to operate with a minimum of absorption of the light and a maximum diffusion.

Other objects will be apparent from a reading of the following description.

Efforts have been made in the past toward producing an opalescent effect, similar to that of the pearl with its dull lustre, particularly in illumination engineering. Such an effect is very pleasing and artistic, especially when obtained in connection with a strong light which it is desired to subdue without sacrificing, to any great extent, the intensity of the light rays. Various methods and contrivances have been used for accomplishing the end sought, many of which are quite familiar to the users of electricity for lighting purposes. One of these is a glass composition, commonly termed opal glass, in which cryolite is employed to obtain the desired effect. When glass of that character is employed in shades, globes and, particularly, electric lamp bulbs, it is to be noted that the diffused light emitted is of low and unequal intensity which is probably due to the light absorption being very high and, furthermore, because such absorption is not uniform. Again, after an electric lamp, having a bulb made of opal glass, has been burned a short time there is a tendency for the glass to decompose and give off gases, as (SiF$_4$) silicon fluoride, which is injurious to the filament of the lamp and shortens its life. The further disadvantage in employing an opaque glass in the bulbs of electric lamps lies in the manufacture of such lamps. In the manufacture of an electric lamp, it is necessary to align the interior structure, termed the mount, in proper relation with respect to the light center. Obviously, unless the bulb is made of transparent or translucent material, such operation cannot be done with any degree of accuracy.

I have discovered that the objects of the invention may be attained and that the disadvantages resulting from the use of opal glass may be avoided by providing a composition of matter or preparation containing certain constituents which, when applied as a coating, alter the light rays in proper proportion and intensity, to provide for maximum diffusion with minimum absorption.

More specifically stated, the invention resides in the production of a preparation composed of a pigment of such nature that its effect on some of the light rays prevents their passage to a more or less extent, that is, it is more or less opaque; a filler made up of particles more or less translucent; and a binder for uniting the pigment and filler together and to any object to which the enamel or paint may be applied.

In addition to the foregoing properties, it is desirable that the coating composition, especially when employed as a superficial coating for electric lamp bulbs, be of such nature that it is substantially waterproof or impervious to water to the extent that it may be cleansed, as by washing or wiping, to remove grease or dirt. Furthermore, the coating composition, when applied to an object, should set into a smooth even coating. Another property it should possess is that of withstanding a temperature of about 400° C. without blistering or chipping off. This latter is essential because the temperature of an electric lamp increases considerably with burning. Inasmuch as electric lamps are frequently exposed to the atmosphere, it is a requisite of such composition that the constituents of the atmosphere shall have no influence thereon.

The best results may be secured if the pigment used be in a finely divided form, as the finer the pigment the more strongly it will adhere to a substance to which it may be applied. The pigment should preferably be substantially pure, white and of such chemical nature that it will not react with the binder. Furthermore, if it is more or less opaque the opalescent effect is more certain to be obtained. The filler should preferably be white and in a very fine state of subdivision. It is also desirable to have a filler of such nature that it will not react with the binder. A further desirable feature is to have it more or less translucent. The smoothness of the coating is greatly enhanced by the selection of a pigment and a filler having a fine degree of comminution. The binder employed should have the proper specific gravity so that, when mixed with the other ingredients, the mixture will be of the right consistency to render its application to an object or substance comparatively easy. It should also serve to firmly hold the pigment and filler together and to any body to which it may be applied, and should have the additional property of setting, upon the application of heat, into a compact, hard and homogeneous mass.

The opalescent effect produced is subject to variations, depending to a considerable extent upon the proportions employed and the manner in which the composition is applied, together with the thickness of the coating. The most pleasing effect is obtained if the proportions are approximately 75 gms. of the pigment, about 100 gms. of the filler and substantially 700 cc. of a solution of the binder having a specific gravity of about 1.2. By altering the quantities of the different ingredients, considerable variation in lighting effects may be produced. For instance, if a greater quantity of filler is employed, the coating will be more in the nature of frosting, whereas, if the quantity of pigment is increased, the coating will have a chalky appearance, and the smooth finish secured by the binder will be destroyed. Variations of the thickness of the coating results in corresponding changes in the intensity of the light. It is believed, however, that, when the proportions are correct, variations in the thickness of the coating will not destroy the opalescent effect but will merely subdue or increase it, depending, of course, upon whether it is thick or thin.

It is desirable that the specific gravity of the aqueous solution of the binder shall approximate fairly closely that mentioned above, because, if the mixture be very viscous, the paint will blister when the lamp is burned. If an alkali binder be used, the alkali content should not be too great, otherwise "blooming" or blisters, resulting from combination of the excess alkali with the carbon-dioxide of the atmosphere, would appear.

A mixture which I have employed and found to meet all the requirements may be as follows, the proportions and materials stated being merely illustrative of one form of coating composition which will produce the desired effects.

As a pigment, I prefer to use tin oxide in the finest grade obtainable. Seventy-five grams of this substance is used in making up the batch. One hundred grams of a filler comprising a very fine grade of pure, white kaoline is mixed with the tin oxide. These substances are added to a binder composed of an aqueous solution of an alkaline silicate, preferably sodium silicate, having a specific gravity of 1.180. About 700 cc. of the binder are employed. This mixture is placed in a mixing vessel and thoroughly agitated until a homogeneous mixture is obtained. The articles or substances to be coated are either sprayed with or dipped into the enamel and thereafter subjected to heat treatment at an elevated temperature of about 125° to 200° C. for approximately two minutes. This latter step sets the enamel and causes the pigment and filler to be firmly united to each other as well as to the body to which the paint has been applied, and, at the same time, makes the paint resistant to disintegrating influences, as heat, moisture, etc. If it is desired to further increase the resistance properties of the coating, it may be sprayed with a 30% solution of ammonium chloride and baked for an additiontal two minutes. The article may then be washed and dried.

The foregoing method is more fully described and claimed in the copending application of Hageman and Schmid, Serial #431,587, filed December 18, 1920, for paint and process of applying the same, and of Hageman and Lindstrom, Serial #461,379, filed April 14, 1921, for a process of coating materials, each of which is assigned to the Westinghouse Lamp Company.

Modifications of the foregoing composition and its application may suggest themselves to those skilled in the art, but such as fall within the scope of the appended claims are contemplated by my invention.

What is claimed is:

1. A coating composition for producing opalescent effects comprising tin oxide, a filler of translucent material and a binder.

2. A coating composition for producing opalescent effects comprising an intimate mixture of tin oxide in a finely divided state, kaolin in a finely divided state and sodium silicate.

3. A paint comprising tin oxide, kaolin and sodium silicate, in such proportions as to produce an opalescent effect when applied to an object.

4. A paint comprising approximately 100 grams of tin oxide, substantially 75 grams of kaolin and about 700 cc. of sodium silicate in a solution having a specific gravity of approximately 1.2.

5. A coating composition adapted to produce opalescent effects consisting of tin oxide and, a substantially translucent substance, said substances being mixed in the proportions of about 4 to about 3 and a binder capable of setting into a compact mass upon the application of heat.

6. A paint composition adapted for coating objects to impart a pearly effect comprising a pigment consisting essentially of tin oxide and a filler of a finely divided translucent material and a binder in which the said pigment and filler are insoluble.

7. A paint composition adapted for coating objects to produce opalescent effects comprising a pigment consisting essentially of tin oxide and a filler of very finely divided white and substantially translucent material, and a binder for uniting the pigment and filler into an integral mass when subjected to heat.

In testimony whereof, I have hereunto subscribed my name September 22, 1921.

ALBERT FERDINAND LINDSTROM.